Patented June 1, 1948

2,442,473

UNITED STATES PATENT OFFICE 2,442,473

PREPARATION OF TETRAHALOGENO-PYRAZINES

John Mayhew Sayward, Springdale, and James Kenneth Dixon, Riverside, Conn., assignors to American Cyanamid Company, New York, N. Y., a corporation of Maine No Drawing. Application December 23, 1946, Serial No. 718,128

7 Claims. (Cl. 260—250)

This invention relates to tetrahalogenopyrazines and to a novel process of preparing these compounds. More particularly, it relates to the halogenation of pyrazines at elevated temperatures in the vapor phase to produce tetrohalogeno compounds such as tetrachloropyrazine.

Tetrachloropyrazine is believed to be a new compound, prepared and isolated for the first time in accordance with the present invention. It is a crystalline solid having a melting point of 97–99° C. The compound itself is useful as an intermediate in the preparation of N-substituted products for use in a number of fields.

The preparation of such compounds and the fact that they may be prepared as by vapor phase chlorination of pyrazine is wholly surprising in view of the known prior art. Such information as was previously available would lead to the supposition that such compounds would not be so obtained.

It has been known in the past that pyrazine, a para, two-nitrogen, heterocyclic, solid compound, cannot be successfully chlorinated or brominated by direct treatment in the liquid or solid states. As a matter of fact, solid pyrazine is rapidly attacked by halogens, to give very largely carbonaceous materials. Therefore, whether or not any halogenation originally occurs, the halogeno products thereof are wholly unobtainable. In similar experiments wherein chlorine was passed through liquified pyrazine as pyrazine in solution only decomposition products were obtained.

In view of these facts, the process described in the U. S. Patent No. 2,391,745 to Sayward, one of the present inventors, is itself quite surprising. In that patent it was disclosed that pyrazine, in the vapor phase, can be chlorinated directly with $Cl_2$, also in the vapor phase, in the presence of water vapor. The reaction is carried out at preferably from about 375° to about 475° C. Instead of the expected mixture of the several halogeno products, substantially only monochloropyrazine is produced.

Despite this prior information, a process of producing tetrahalogeno compounds, such as tetrachloropyrazine, remained highly desirable. Preferably, such a process should be one of direct halogenation of pyrazine in order to employ the more readily available starting materials. Preferably, too, such a process should be operable in the vapor phase in order to obtain the advantages of simplicity, flexibility, and ease of control which makes such processes highly suitable for commercial production. It is, therefore, the principal object of the present invention not only to produce tetrahalogenopyrazines such as tetrachloropyrazine, but to produce them by a process meeting these requirements.

It would appear from a study of the above-noted, earlier work that the accomplishment of these objects is impractical if not impossible. A procedure meeting such requirements controverts all expectations based on available facts.

Based on the known decomposition of pyrazine by halogens, even at ordinary temperatures, it was thought that no halogenated pyrazines could be obtained by direct halogenation. When the Sayward disclosure demonstrated that this assumption erred as applied to the vapor phase, monochloropyrazine being readily produced, it was then assumed that only monohalogeno-derivatives would be obtainable in attractive yields. This was strengthened by subsequent discovery that in the presence of a catalyst and nitrogen as a diluent, substantially pure monochloropyrazine was obtained by contacting chlorine and pyrazine in the vapor phase at elevated temperatures.

Surprisingly, the objects of the present invention are readily met by direct contact of a halogen, such as chlorine, and pyrazine in the vapor phase at from about 350°–550° C., in the presence of water vapor, provided the correct amount of chlorine is present at any one time. The vapors are given a relatively short contact at the reaction temperature, the condensible vapors condensed and the tetrahalogeno-product recovered by distillation.

The success of the reaction is believed due to the stage addition of the halogen so that a suitable amount is present at any one time. It was the earlier belief that an excess of pyrazine was necessary in order to insure that all the chlorine be used up and thus prevent decomposition of pyrazine on subsequent condensation. Instead, in the present invention, sufficient halogen is initially used to insure almost immediate halogenation substitution of some halogen in all the pyrazine, since it has been found that halogens do not decompose even partially halogenated pyrazines.

It is known that to insure complete conversion of all the pyrazine to the tetra-substituted product four mols of halogen must eventually be used per mol of pyrazine. However, it has been found, in accordance with the present invention, that this cannot be practically accomplished in one single operation. An initial mol ratio of halogen to pyrazine exceeding about 1.5:1 reacts so violently as to be virtually uncontrollable. Therefore, the initial admixture of pyrazine and halozen must not be at such a rate that the chlorine content exceeds this ratio. It is equally obvious that the entire 1.5 moles need not be added in a single stage. Once the initial 1.5 moles of halogen has substituted the remaining necessary halogen may be added in one or more steps, as may be desired.

As to the amount of chlorine used and its rate of feed, the process is fairly flexible. In terms of mol ratios, it has been found that an initial chlorine-pyrazine ratio of 1.3:1 is about the minimum desirable limit, although any ratio greater than 1:1 yields some tetrahalogenated product. Using total final ratios of higher than about 4:1 is wasteful in requiring venting of unused excess chlorine. Below this level this problem is not serious.

Having accomplished the initial substitution of about 1.3 to 1.5 moles of halogen per mol of pyrazine, the procedure may be varied. The tetrahalogenated product may be separated and the remainder recycled with additional halogen. This is not essential since the whole product may be recycled with additional halogen. The tetrasubstituted product need only be removed when it exceeds a certain desired concentration.

As to the reaction rate, the process is also quite flexible. For any fixed apparatus, almost any feed rate that can be used while maintaining the reaction temperature in the reaction zone is satisfactory. At reaction temperatures below about 300° C. the rate is too slow for any practical contact time. A more satisfactory rate is obtained at about 350° C. Yields continue to improve as the reaction rate is increased due to increased temperatures up to about 475°–500° C., when the reaction, which is exothermic, becomes so violent that yields again begin to fall off. The operation becomes wholly impractical at temperatures well below 600° C.

A number of factors are useful in preventing excessive temperature rises in the reactor. One of these is the effect of varying the amount of water vapor present since this affects the real contact time and also the water vapor absorbs part of the heat of the reaction and helps control the rate. The water vapor is easily introduced, either from a separate vaporizer or by vaporizing a solution of pyrazine in water. The amount used may be quite widely varied. Good practice is obtained using mol ratios of water to pyrazine as low as about 1.25 to 1 and as high as about 25 to 1. A somewhat narrower range of from about 5:1 to about 15:1, with an average of about 10:1 is generally to be preferred.

Another factor in controlling temperature rise in the reactor is the temperature at which the pyrazine-water vapor mixture is combined with the halogen gas. There is a definite practical advantage in preheating the gas and vapors before admixture. The most rapid, and therefore most useful, rate would be obtained by admixing the reactants at the desired reaction temperature were it not for the exothermic feature. To prevent the latter from causing the temperature to exceed the 475°–500° C. range, it is necessary to combine the reactants at a lower temperature. This is true even though it lengthens the contact time. A contact time of about 0.2–0.3 second is generally found to be desirable although as short as about 0.1 to as long as about 10.0 seconds can be used.

Another means of controlling the reaction rate and therefore the temperature is to adjust the initial halogen-pyrazine mol ratio. In adding the initial 1.5 moles of halogen in a single increment, it should be borne in mind that the temperature at the point of admixture must be necessarily lower than if the initial ratio is less than 1.5. On the other hand, it must be realized that if the initial ratio is too low, the required contact time may be excessive. Consequently, an initial ratio lower than the above noted 1.2 to 1.3:1 is undesirable, even though it is perfectly possible to add the halogen in smaller increments which total the eventual initial 1.5:1 ratio.

No special apparatus or any catalyst is necessary. The reactor may be any suitable closed space. It should be large enough to insure the correct contact time. It should not be constructed from a material, such as copper or ordinary steel, which may be attacked by the reactants or which may react with halogens to produce salts having a catalytic effect on pyrazine or halogenopyrazines. We have found materials such as glass, quartz or stainless steels to be satisfactory.

It would appear that the principal function of the water vapor is to serve as a diluent. That it does serve this function is shown by the fact that it can be replaced by other inert diluents such as carbon tetrachloride or nitrogen gas. However, it also appears to have some particular advantages which may be due to some additional action. For example, in using nitrogen or carbon tetrachloride and the like as diluents, to control contact time and temperature, very appreciable amounts of tars and decomposition products are obtained. These are largely absent when water vapor is used.

While not intended as other than illustrative, a good practice of the present invention is shown in the following example of chlorinating pyrazine.

*Example*

A solution of pyrazine in water, in a molar ratio of about 1:10 was continuously fed to a vaporizer, the vapors being heated to about 325°–350° C. and the preheated vapors fed into a continuous reactor tube at a substantially constant rate. A substantially steady flow of chlorine gas, preheated to about the same temperature was also added at a chlorine-pyrazine ratio of about 1.5:1. The preheated materials were fed so as to maintain a contact time of about 0.3 second in a reaction zone maintained at a substantially constant temperature of 375° C. The reaction mixture heated spontaneously to about 400° C. and then due to heat transfer through the walls of the reactor, the temperature decreased to the average value of 375° C. At this point additional chlorine was continuously introduced at a rate sufficient to produce a total chlorine-pyrazine ratio of about 4.0:1. The reacted mixture was condensed. The condensed material was freed by distillation of material boiling below about 220°–225° C. The residue, which solidified on cooling, was taken up in hot methyl alcohol, filtered hot, and cooled with ice. The product crystallized as slightly brownish crystals which were again recrystallized from methyl alcohol and then had a melting point of 97°–99° C. The crystals are soluble in hydrocarbon solvents such as benzene, hot lower aliphatic alcohols and carbon tetrachloride, but substantially insoluble in water.

We claim:
1. In the preparation of tetrahalogenopyra- zines, the steps which comprise preheating vaporized pyrazine, water and halogen; mixing the preheated vapors; subjecting the mixture to elevated temperatures in the vapor phase, whereby the pyrazine is substituted by halogen; maintaining initial halogen-pyrazine mol ratio in the vapors being reacted at not more than about 1.5:1 until about 1.5 mols of halogen per mol of pyrazine has reacted; increasing the chlorine-pyrazine ratio sufficiently to insure the formation of tetrahalogenated pyrazine, condensing the condensible portion of the reacted vapors, and isolating the tetrahalogenated pyrazine from the condensate.

2. A process according to claim 1 in which the initial chlorine-pyrazine ratio is about 1.2:1; additional amounts of halogen are added in amounts which do not exceed a 1.5:1 ratio until 1.5 mols of halogen per mol of pyrazine has reacted and the ratio is then increased to at least 2:1.

3. A process according to claim 1 in which the reaction is carried out at from 350°–500° C., the preheating temperature not exceeding about 50° C. less than the reaction temperature.

4. A process according to claim 1 in which the halogen is chlorine.

5. A process according to claim 1 in which the halogen is chlorine and the reaction temperature is controlled at from 350°–475° C.

6. A tetrahalogenopyrazine prepared by preheating, vaporized pyrazine, water and halogen; mixing the preheated vapors; subjecting the mixture to elevated temperatures in the vapor phase, whereby the pyrazine is substituted by halogen, maintaining initial halogen-pyrazine mol ratio in the vapors being reacted at not more than about 1.5:1 until about 1.5 mols of halogen per mol of pyrazine has reacted; increasing the chlorine-pyrazine ratio sufficiently to insure the formation of tetrahalogenated pyrazine, condensing the condensible portion of the reacted vapors, and isolating the tetrahalogenated pyrazine from the condensate.

7. Tetrachloropyrazine.

JOHN MAYHEW SAYWARD.
JAMES KENNETH DIXON.